KEYED AGC CIRCUIT HAVING ADJUSTABLE CAPACITIVE VOLTAGE DIVIDER MEANS FOR SETTING AMPLITUDE OF KEYING PULSES

Filed May 15, 1964

WITNESSES:

Bernard R. Gieguez

James T. Young

INVENTORS
Donald E. Knoebel and
Joseph W. Percival.
BY
Samuel Ottie

United States Patent Office 3,361,874
Patented Jan. 2, 1968

3,361,874

KEYED AGC CIRCUIT HAVING ADJUSTABLE CAPACITIVE VOLTAGE DIVIDER MEANS FOR SETTING AMPLITUDE OF KEYING PULSES

Donald E. Knoebel, Edison, and Joseph W. Percival, Colonia, N.J., assignors to Westinghouse Electric Corporation, East Pittsburgh, Pa., a corporation of Pennsylvania Filed May 15, 1964, Ser. No. 367,705
5 Claims. (Cl. 178—7.3)

ABSTRACT OF THE DISCLOSURE

A keyed AGC circuit is provided in a television receiver for controlling the gain of selected amplifier stages. The AGC circuit includes an electron tube which has its control grid connected to a source of video signals and its anode connected to a source of keying pulses. The magnitude of the keying pulses is adjustable being set by varying one arm of a capacitive voltage divider. The circuit can thus be adjusted for optimum operation for both strong and weak signal conditions.

Figures 1, 2:
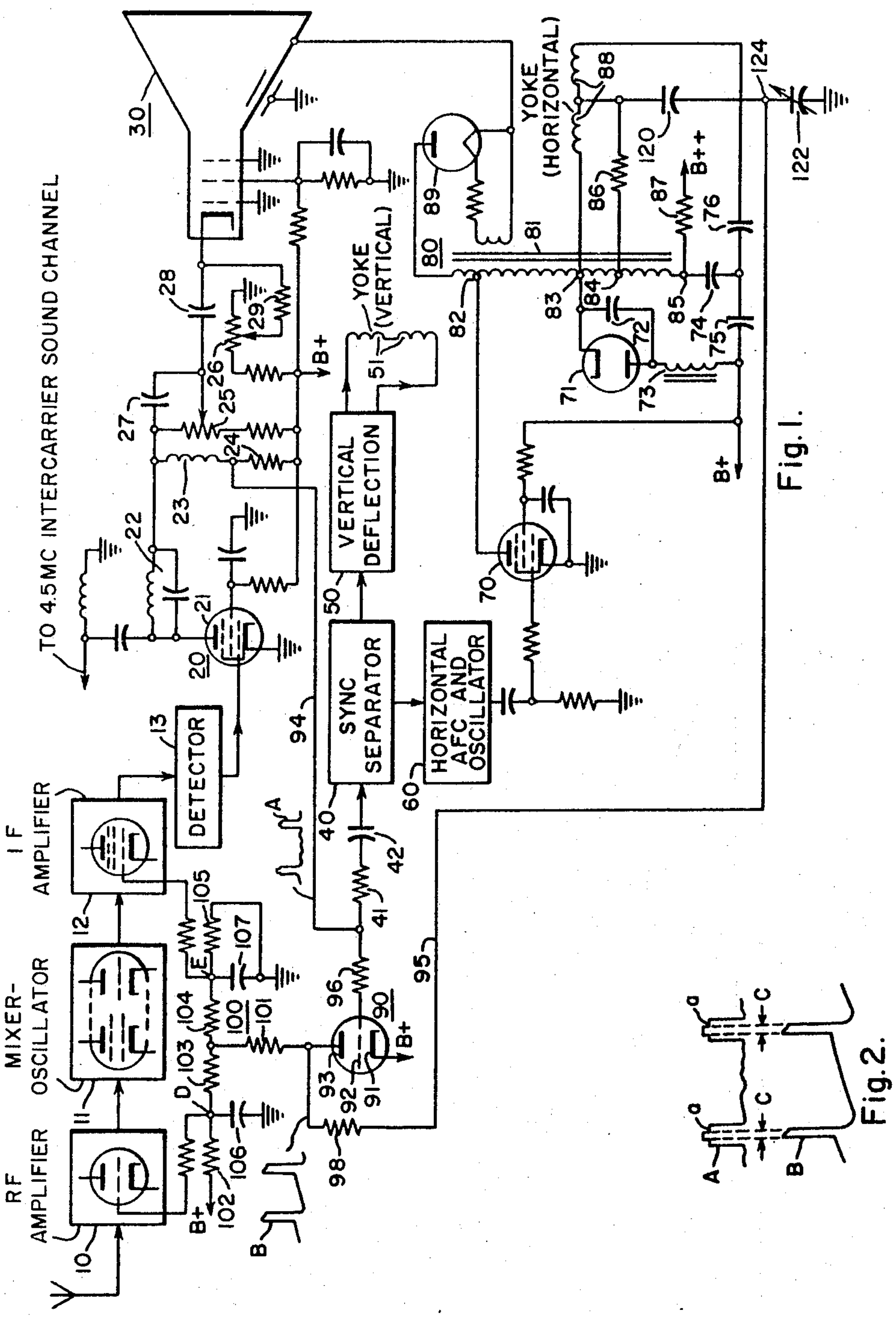

The present invention relates to automatic gain control circuits, and more particularly to keyed automatic gain control circuits which are adjustable for use in television receivers. The conventional automatic gain control (AGC) circuit used in television receivers is usually of the gated or keyed type. In this type of circuit video information, including horizontal synchronizing pulses, and flyback or gating pulses, generated in the receiver are applied to a gating tube, commonly a pentode, so that when time coincidence occurs between the horizontal synchronizing pulses and flyback pulses, the gating tube will be rendered conductive and provide a signal indicative of the amplitude of television signal being received. This signal is then filtered resulting in a variable D.C. signal which is usually applied to the radio frequency amplifier and one or more intermediate frequency amplifiers of the receiver. It is desirable in such a system to be able to adjust the amount of AGC voltage developed by the gating tube to provide an optimum amount of attenuation of both weak and strong signals by the AGC circuit. The adjustment of the AGC circuit is desirable so that high amplitude received signals do not overdrive the receiver and limit or crush the sync pulses resulting in picture distortion, while at the same time providing maximum amplification of weak signals. Conventionally, a pentode tube is utilized to provide the AGC voltage. A potentiometer is used in conjunction with the pentode tube to vary the voltage between the cathode and the control grid of the tube. The use of these components results in a relatively complicated and thus expensive design.

In Patent No. 3,294,904, issued Dec. 27, 1966, assigned to the same assignee as the present application, an automatic gain control circuit is shown wherein a variable trimmer capacitor is connected between a source of triggering or flyback pulses and a triode tube, which has its control electrodes connected to a source of synchronizing pulses. By coincidence of these pulses, a keyed automatic gain control voltage will be generated by the triode. The trimmer capacitor is adjustable to vary the magnitude of the trigger pulses applied to the tube and thereby control the magnitude of the AGC voltage developed by the tube. In this arrangement, however, both sides of the trimmer capacitor are at elevated potentials. This necessitates the use of an insulated mounting to the chassis and an insulated adjusting tool. The elimination of the elevated potentials at both sides of the variable capacitor would be advantageous from a cost and a utilization standpoint.

It is, therefore, an object of the present invention to provide a new and improved automatic gain controlled circuit which permits the use of a grounded trimmer capacitor and grounded adjustment.

It is a further object of the present invention to provide a new and improved keyed automatic gain control circuit in which lower pulse voltages appear across a trimmer capacitor and a greater latitude of acceptable pulse source voltages may be utilized.

Broadly, the present invention provides an automatic gain control circuit in which an electron device is supplied with synchronizing pulses and flyback triggering pulses to supply an automatic gain control voltage upon time coincidence of these pulses. A voltage divider including a variable capacitive element is utilized to control the amplitude of the trigger pulses by applying the voltage across the variable capacitive element to the electron device.

These and other objects of the present invention will become more apparent when considered in view of the following specification and drawings, in which:

FIGURE 1 is a schematic-block diagram showing a television receiver employing the automatic gain control circuit of the present invention; and FIG. 2 is a waveform diagram used in the explanation of the operation of the automatic gain control circuit of the present invention.

Referring to FIG. 1, a television receiver is shown having a gated automatic gain control circuit embodying the present invention. The receiver as shown is conventional except for the automatic gain control circuit utilized. More specifically, the television receiver includes a conventional receiving channel comprising an RF amplifier 10 which receives a television signal from an antenna. After being amplified in amplifier 10 the signal is then fed to a mixer oscillator 11 of the conventional type to provide an output of the intermediate frequency of 44 megacycles. The output of the mixer oscillator 11 is then fed to an intermediate frequency amplifier shown diagrammatically as 12. It will be understood that more than one intermediate frequency amplifier can be used. The output of the intermediate frequency amplifier stage 12 is fed to a detector 13 for demodulating the composite video signal. After demodulation by the detector 13, the signal is then fed to a conventional video amplifier 20 having a pentode 21. As in most conventional video output stages, the 4.5 megacycle intercarrier sound signal is developed in a resonant tank circuit 22 to feed a 4.5 megacycle inter-carrier sound channel to reproduce the sound of the composite video signal. Connected between this tank 22 and B+ is an alternating current voltage divider including an inductor 23 and a resistor 24. Conventionally between the same terminals is a variable voltage and contrast control 25. Connected between the B+ or direct voltage supply and ground is a variable brightness control 26 with the wiper of brightness control 26 being connected through a resistor 29 to the cathode of a cathode ray tube 30. The wiper of potentiometer 25 is connected to the cathode of the CRT tube 30. A peaking capacitor 27 is also connected between the wiper of potentiometer 25 and the 4.5 megacycle trap 22.

The foregoing description is by way of illustration of a conventional television receiver and the details of this are so well known in the art that it is felt that a more detailed description is unnecessary. A conductor 94 is connected at one end to a point between inductor 23 and resistor 24 to provide a composite video signal. The composite video signal is shown as a pulse A in FIG. 2, while a synchronizing signal is illustrated as the portion *a*.

The composite video signal A is fed through a resistor 41 and a coupling capacitor 42 to a sync separator 40. The separator 40 separates the synchronizing pulses from the video signal. The output of the separator 40 is fed to a vertical deflection circuit 50 to provide the necessary vertical deflection for the cathode ray tube 30. The output of the vertical deflection circuit 50 is fed to deflection coils 51 so as to effect necessary vertical deflection of the electron beam of cathode ray tube 30. The horizontal sync pulses are fed from the sync separator 40 to a horizontal automatic frequency control and oscillator circuit 60. The horizontal deflection signal is then fed to a horizontal output stage so as to provide the necessary horizontal deflection of the electron beam for the cathode ray tube 30. This horizontal output circuit includes a pentode 70. The output signal of the tube 70 is applied across a so-called flyback transformer 80. The flyback transformer 80 includes a core 81 and is generally of the autotransformer type. The flyback transformer 80 has a first tap 82 connected to the anode of pentode 70. The second tap 83 of this flyback transformer is connected to a shunt combination of the capacitor 72 and a diode 71. The other end of this shunt combination is connected through a choke 73 to the B+ supply for the television receiver. The second tap 83 of the autotransformer 80 is also connected to one side of the series connected horizontal deflection coils 88. The midpoint of these two deflection coils 88 is connected through a resistor 86 to a third tap 84 on the autotransformer 80. At the third tap 84 flyback or trigger pulses are developed, see FIG. 2. The other end of the deflection coil 88 is connected to a fourth tap 85 of the transformer 80 through capacitors 76 and 74. A resistor 87 is connected between the fourth tap 85 of the transformer 80 so as to develop a so-called B boost voltage for supply to various portions of the set such as the FM detector and vertical multivibrator.

The above description of the horizontal and vertical deflection circuit is merely a description of a conventional circuit and further details of the operation thereof is felt to be unnecessary.

In the present invention, a gated AGC tube 90 is employed which is a triode. The cathode 91 of the triode 90 is connected to the B+ supply of the television receiver. The control grid 92 is connected through the resistor 96 to conductor 94 so as to supply the video signal A with positive going sync pulses *a* to the control grid 92.

To provide flyback or triggering pulses to the triode 90, a voltage divider including a capacitor 120 and a variable trimmer capacitor 122 is connected between the resistor 86 and ground. A resistor 98 and a lead 95 connect the anode 93 of the triode 90 to the junction point 124 formed between the capacitors 120 and 122. Triggering pulses B (see FIG. 2) are thus applied to the anode 93 of the triode 90. The amplitude of these pulses is controlled by the adjustment of the trimmer capacitor 122. Since one end of the trimmer capacitor 122 is grounded, adjustment may be effected without the necessity of an insulator mounted to the chassis or the use of an insulated adjustment tool.

The anode of triode 90 is connected through a resistor 101 to a filtering network to convert the periodic conduction current of tube 90 into a negative going variable D.C. signal which varies in accordance with the strength of the received sync pulses *a*. More specifically, the resistor 101 connects plate 93 to the midpoint connection of series connected resistors 103 and 104. As shown in FIG. 1, another resistor 102 is connected to a resistor 103 with capacitor 106 connected between these resistors to ground. The resistor 102 can be as is well known connected to a B+ supply to provide a delayed voltage AGC at point D which can then there be applied through a resistor to the grid of the radio frequency amplifier 10. At potential point E, between series connected resistors 104 and 105, a capacitor 107 is connected to ground. The other end of resistor 105 is also connected to ground.

Therefore, an AGC voltage at point E can be, as is customary, connected to the grid of an IF amplifier through a resistor, to provide an AGC voltage thereto. The filter and/or delayed AGC circuit described is meant only by way of an example of a conventional method of utilizing the negative going potential developed by the gating tube. Various other means of filtering and applying the resultant AGC signal to the television receiving channel can be utilized.

In the present invention, the flyback pulses B are applied to the anode 93 of the gating tube 90 whereas the video signals A with its horizontal synchronizing pulses *a* are applied to the control grid 92 of the tube. When as shown in FIG. 2 at C, there is time coincidence between the horizontal sync pulses *a* and the flyback pulses B, the tube 90 will conduct to develop a negative control voltage at the anode 93. As discussed above, however, it is frequently desirable to employ an adjustment so that the amplitude of the AGC signal developed by tube 90 can be varied to provide optimum attenuation by the AGC circuit. In the present invention, the horizontal flyback pulses B applied to the anode 93 are controlled in amplitude by the adjustment of the variable capacitor 122. By adjusting this variable capacitance, the amplitude of the flyback pulses applied to anode 93 can be varied to thereby result in varying the AGC current resulting from the conduction of triode tube 90 during the periods C. Hence, it will be seen that this variable capacitor enables the use of a triode as the gating AGC tube which will conduct in response to the anode voltage and also replaces as can be seen a substantial number of connections and electrical components. More specifically, by varying the amplitude of flyback pulses by capacitor 122, a triode AGC tube can be employed satisfactorily along with a minimum number of other connections. Also through the use of the voltage divider arrangement greater variations in the trigger voltages can be accommodated as well as limiting the magnitude of voltage appearing across the trimmer capacitor 122.

Although the present invention has been described with a certain degree of particularity, it should be understood that the present disclosure has been made only by way of example and that numerous changes and the details of fabrication and the combination and arrangement of elements and circuitry may be resorted to without departing from the scope and the spirit of the present invention.

We claim as our invention:

1. In a television receiver to receive television signals modulated by video signal components and periodic synchronizing signal components, said receiver developing therein keying pulses during a retrace interval defined by said synchronizing signal components, the combination of: an automatic gain circuit comprising an electron device, first connecting means for applying said synchronizing signal components to said electron device, a voltage divider to receive said keying pulses and including variable capacitive means having one end at ground potential, and second connecting means operatively connecting said device across the variable capacitive means of said voltage divider to apply said keying to said electron device, said variable capacitive means being operative to vary the amplitude of said keying pulses, and said device being responsive to the time coincidence of said keying pulses and said synchronizing signal components to supply an automatic gain control signal to said receiver.

2. In a television receiver to receive television signals modulated by video signal components and periodic synchronizing signal components, said receiver developing therein keying pulses during a retrace interval defined by said synchronizing signal components, the combination of: an automatic gain control circuit comprising an electron tube including anode, cathode and control electrodes, first connecting means for applying said synchronizing signal components to said control electrode, a voltage divider to receive said keying pulses and including a variable capacitive element having one end grounded, and second connecting means connecting the anode electrode of said electron device across said variable capacitive element of said voltage divider to apply said keying pulses to said anode electrode, said variable capacitive element being operative to vary the amplitude of said keying pulses, and said valve being responsive to the time coincidence of keying pulses and said synchronizing signal components to supply an automatic gain control signal to said receiver.

3. In a television receiver to receive television signals modulated by video signal components and periodic synchronizing signal components, said receiver developing therein keying pulses during a retrace interval defined by said synchronizing signal components, the combination of: an automatic gain circuit comprising a triode vacuum tube including anode, cathode and control electrodes, first connecting means for applying said synchronizing signal components to said control electrode, a voltage divider to receive said keying pulses and including a variable capacitor having one end grounded, and second connecting means connecting the anode electrode of said tube to the ungrounded end of said variable capacitor to apply said keying pulses to said anode electrode, said variable capacitor being operative to vary the amplitude of said keying pulses, and said tube being responsive to the time coincidence of said keying pulses and said synchronizing signal components to supply an automatic gain control signal to said receiver.

4. In a television receiver to receive television signals modulated by video signal components and periodic synchronizing signal components, said receiver developing therein keying pulses during a retrace interval defined by said synchronizing signal components, the combination of: an automatic gain circuit comprising an electron device, first connecting means for applying said synchronizing signal components to said device, a voltage divider to receive said keying pulses and including a capacitor and a variable capacitor connected in series with a junction being formed therebetween, said second connecting means connecting said device to the junction of said voltage divider to apply said keying pulses to said device, said variable capacitor being operative to vary the amplitude of said keying pulses, and said device being responsive to the time coincidence of said keying pulses and said synchronizing signal components to supply an automatic gain control signal to said receiver.

5. In a television receiver to receive television signals modulated by video signal components and periodic synchronizing components, said receiver developing therein keying pulses during a retrace interval defined by said synchronizing signal components, the combination of: an automatic gain control circuit comprising a triode vacuum tube including anode, cathode and control electrodes, first connecting means for applying said synchronizing signal components to said control electrode, a voltage divider to receive said keying pulses and including a capacitor and a variable trimmer capacitor connected in series with a junction being formed therebetween, and second connecting means connecting the anode electrode of said tube to the junction of said voltage divider to apply said keying pulses to said anode electrode, said variable trimmer capacitor being operative to vary the amplitude of said keying pulses, and said tube being responsive to the time coincidence of said keying pulses and said synchronizing signal components to supply an automatic gain control signal to said receiver.

References Cited

UNITED STATES PATENTS

| | | | |
|---|---|---|---|
| 2,529,428 | 11/1950 | Spielman | 178—7.3 |
| 3,270,128 | 8/1966 | Stark | 178—7.5 |
| 3,294,904 | 12/1966 | Percival | 178—7.5 |

OTHER REFERENCES

Fink, Television Engineering Handbook, 1957, pp. 16–146, 16–147.

JOHN W. CALDWELL, *Primary Examiner.*

R. L. RICHARDSON, *Assistant Examiner.*